Nov. 30, 1965   P. E. SODEN   3,220,145
WORKPIECE EJECTOR FOR CENTERLESS GRINDING MACHINE
Filed March 25, 1963   2 Sheets-Sheet 2
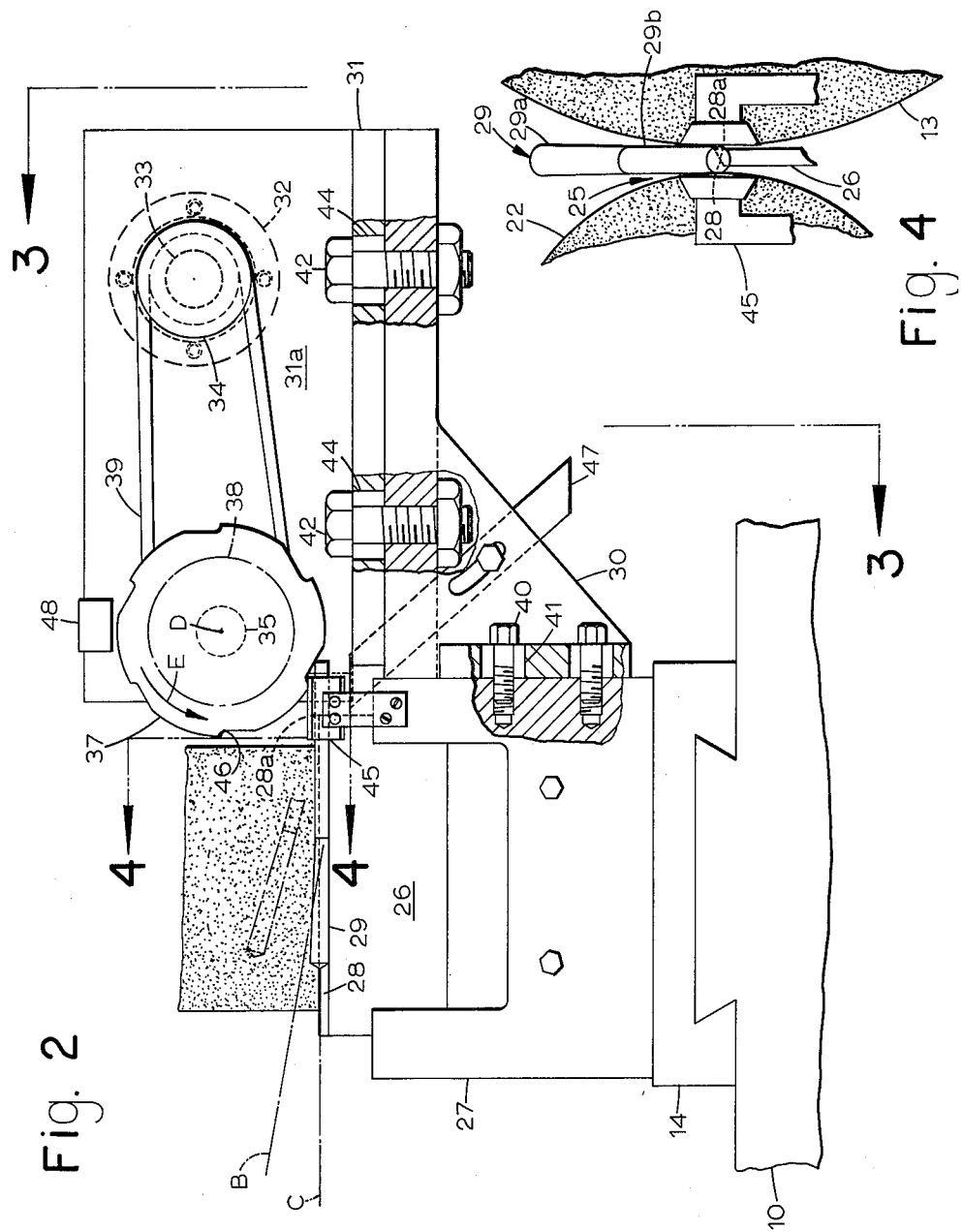

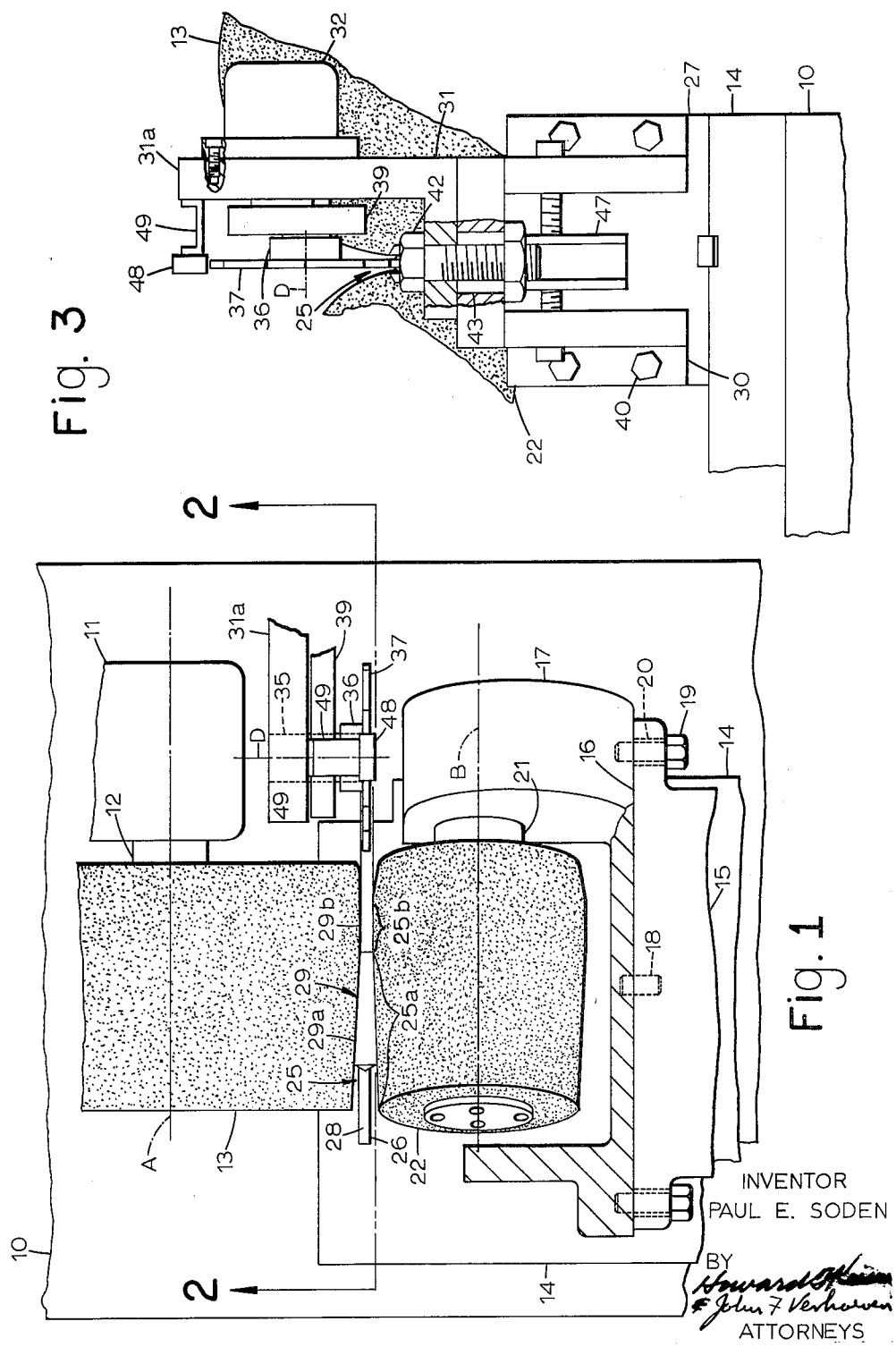

United States Patent Office 3,220,145
Patented Nov. 30, 1965

3,220,145
WORKPIECE EJECTOR FOR CENTERLESS
GRINDING MACHINE
Paul E. Soden, Walton, Ky., assignor to The Cincinnati
Milling Machine Co., Cincinnati, Ohio, a corporation
of Ohio
Filed Mar. 25, 1963, Ser. No. 267,502
3 Claims. (Cl. 51—103)

The present invention relates to a centerless grinding machine and, more particularly, to mechanism for ejecting workpieces from the grinding throat.

In centerless grinding by the infeed method a workpiece is supported on a blade in engagement with the periphery of a regulating wheel for rotation at a controlled rate and for abrading contact with the periphery of a grinding wheel positioned opposite the regulating wheel. The workpiece is held in a fixed axial position on the blade in the grinding throat defined by the opposing wheels, and relative movement of the wheels to contract the grinding throat, as by infeed movement of the regulating wheel, effects the grind on the workpiece. Since there is no axial movement of the workpiece, the shape formed on the workpiece is determined in accordance with the contour of the wheels. For example, a tapered workpiece can be readily formed when one or both wheels are beveled to define a tapered throat therebetween. In centerless infeed grinding, for each workpiece ground, relative movement between the wheels is required (to contract the throat for the grind and to expand the throat for replacement of the ground workpiece with an unground workpiece).

A more rapid centerless grinding operation can be effected by the throughfeed method in which the wheels are positioned a fixed distance apart and workpieces are fed along the blade (usually by tilting the regulating wheel) one after the other, through the grinding throat. Usually the peripheries of the wheels are parallel to produce cylindrical workpieces, but, regardless of the contour on the wheels, irregular or tapered shapes can not be formed on workpieces if the workpieces are fed all the way through the throat because the diameter of the workpieces along their entire length will be determined by the spacing of the wheels at the rear, or exit, end of the grinding throat.

In one type of operation for which the present invention is particularly suitable, workpieces are formed with a cylindrical shank and a tapered body by the more rapid throughfeed method despite the tapered configuration of the workpiece. For this operation, the grinding throat, or a portion thereof, is tapered and the workpieces are fed shank end first into the wide end of the throat. After the shank has been fed through the tapered portion of the throat, and before the body portion of the workpiece moves out of the tapered portion of the throat, the workpiece is removed from the throat, leaving a taper on the body portion of the workpiece.

In the present invention workpieces are removed from the throat by a rotary striker member, adjacent the narrow, or rear, end of the throat, which strikes the extending shank of each workpiece beyond the end of the workpiece supporting blade to tilt the workpiece out of the throat. In the preferred form of the invention, the rotary striker member constitutes a wheel aligned with the blade and extending into the path of workpieces moving out of the grinding throat to stop the axial movement of each workpiece. The wheel, which is continuously rotated, has peripheral notches which strike the end of each workpiece and tilt the workpiece up off the blade and into a discharge chute. Preferably, the wheel is magnetized better to guide the workpiece out of the throat and into the chute.

It is therefore one object of the present invention to provide an improved mechanism for removal of workpieces from the grinding throat of a centerless grinder. It is another object of the present invention to provide mechanism for removing workpieces which are fed endwise into a tapered grinding throat before the workpieces move completely through the grinding throat. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a fragmentary plan view of a centerless grinding machine incorporating the present invention;

FIG. 2 is a view taken on the line 2—2 of FIG. 1;

FIG. 3 is a view taken on the line 3—3 of FIG. 2; and

FIG. 4 is a view taken on the line 4—4 of FIG. 2.

There is shown in FIG. 1, a fragmentary plan view of a centerless grinding machine having a base 10 on which is mounted a wheelhead 11. The wheelhead rotatably carries a spindle 12 extending therefrom and having on the outer end thereof a grinding wheel 13 for rotation on the central horizontal axis A of the grinding wheel and spindle. A lower slide 14 is mounted on the base and carries thereon an upper slide 15 which has a vertical external face 16 thereon. A regulating wheel housing 17 is mounted on face 16 by means of pivot pin 18 and bolts 19, the latter of which extend through vertically extending slots 20 in flanges on the upper slide 15. The regulating wheel housing rotatably supports a spindle 21, which has a central axis B and which carries a regulating, or control, wheel 22 thereon for rotation on axis B.

The grinding wheel and regulating wheel define a grinding throat 25 therebetween and a blade 26 is vertically mounted in a blade support 27 (omitted from FIG. 1 for simplicity but see FIG. 2) on lower slide 14. The blade has an upper support surface 28 to support a workpiece 29 in the grinding throat for rotation by the regulating wheel 22 and abrading contact with the grinding wheel 13. The structure described above is similar to conventional centerless grinder structure and, as for conventional throughfeed centerless grinding operation, the regulating wheel is tilted with respect to a plane perpendicular to the central axis C of a workpiece supported on the blade (which workpiece axis is parallel to the axis A of the grinding wheel), as indicated in FIG. 2, to impart axial movement to the workpiece on the blade (from left to right as viewed in FIG. 1) toward the rear of the grinding throat. The grinding wheel and regulating wheel are trued (by conventional truing mechanism not shown) to form a front beveled, or tapered, throat portion 25a (defined by beveled, or tapered profile portions on the wheels) for line engagement with a body portion 29a of the workpiece, and a rear, straight, throat portion 25b (defined by straight parallel profile portions on the wheels) for line engagement with a shank portion 29b of the workpicee.

A support bracket 30 is connected to the back end of blade support 27 and extends rearwardly therefrom. An L shaped mounting bracket 31 is carried by support bracket 30 and has a motor 32 connected to the upstanding leg 31a of bracket 31. The motor 32 has a shaft 33 extending through leg 31a which carries a pulley 34. An axle 35 is journaled in leg 31a, in front of the motor shaft, and is received in hub 36 of wheel 37. Axle 35 carries a pulley 38 which is connected by endless belt 39 to pulley 34 so that wheel 37 is rotated about the central axis D of axle 35 by motor 32. The wheel 37 lies in the plane of the blade 26 and extends into the path of a workpiece leaving the upper, workpiece supporting, surface 28 of the blade. It will be noted that support bracket 30 is connected to blade support 27 by bolts 40 which extend through vertically extending slots 41 so that, when the bolts are loosened, the support bracket 30 can be adjusted vertically to vertically adjust the wheel 37. Also, mounting bracket 31 is connected to support bracket 30 by bolts 42 which extend through laterally extending slots 43 in support bracket 30 and through longitudinally extending slots 44 in mounting bracket 31 so that, when the bolts 42 are loosened, the mounting bracket, and hence the wheel 37, can be adjusted laterally with respect to the grinding throat and towards or away from the grinding throat.

The present invention is particularly suitable for workpieces which, when ground, are to have a body portion 29a in the shape of a truncated cone, and a cylindrical shank 29b. Shapes of this type are commonly used in the manufacture of drills. The workpiece blank to be ground may be either cylindrical, or may be shaped with a conical and cylindrical portion. After the machine has been adjusted for a throughfeed grinding operation (during which type of operation the grinding wheel, blade and regulating wheel are held in fixed relation) workpieces are fed, one after the other, into the front (or wide) end of the grinding throat (shank end first if the workpiece blanks have a shank and tapered body portion). The workpicees are given an axial movement along the blade toward the rear (or narrow) end of the grinding throat by virtue of the tilt of the regulating wheel. The shank end of the workpiece advances beyond the back edge 28a of the workpiece support surface 28 (between rear guides 45 straddling the blade) and into contact with the periphery of wheel 37. At this time the body portion of the workpiece is still in the tapered portion 25a of the grinding throat, and the workpiece must be removed from the grinding throat before the body portion of the workpiece can advance into throat portion 25b where it would be ground down to a cylindrical shape.

The wheel 37, which defines a workpiece striker wheel and continuously rotates as indicated by arrow E, has peripheral, angularly spaced, notches 46 which impinge on a workpiece engaged with the periphery of the wheel. The impact on the workpiece tilts the workpiece on the back edge 28a of surface 28 to lift the body portion of the workpiece out of the grinding throat. Preferably, the wheel 37 is magnetized to provide a grip on the workpiece until the workpiece is tilted into the chute 47 which is secured in support bracket 30. The wheel, which is made of a magnetic material, is magnetized by a permanent magnet 48 suspended above the wheel by a non-magnetic bracket 49 (for example, stainless steel) secured to leg 31a. Guides 45, also made of non-magnetic material, are spaced to provide sufficient clearance for the coaxial body portion of the workpiece. The weight of the workpiece, as it tilts into the chute, breaks the magnetic grip of the wheel thereon, and the workpiece falls through the chute into a suitable receptacle.

What is claimed is:

1. In a centerless grinding machine, the combination comprising a grinding wheel, a blade adjacent the grinding wheel having an upper surface to support a workpiece thereon for abrading contact with the grinding wheel, a regulating wheel positioned to engage the workpiece opposite the grinding wheel for controlled rotation thereof, said grinding wheel and regulating wheel defining a grinding throat therebetween having a front end and a rear end and contoured to define a tapered throat section at the front end of the grinding throat, the regulating wheel tilted from a plane perpendicular to the axis of a workpiece on the blade to impart a throughfeed movement to the workpiece toward the rear end of the grinding throat, a striker wheel mounted adjacent the rear end of the grinding throat and in the plane of the blade, the striker wheel extending into the path of a workpiece leaving the upper surface of the blade and positioned for engagement by the workpiece beyond an end of said blade surface to arrest throughfeed movement of the workpiece, the striker wheel having a periphery and having notches on the periphery, and means continuously to rotate the striker wheel to tilt a workpiece engaged therewith about said end of said blade surface and out of the grinding throat.

2. The machine of claim 1 in which the striker wheel is magnetized to prevent shifting of the workpiece out of the plane of the blade as the workpiece is tilted out of the tapered grinding throat.

3. In a machine for centerless throughfeed grinding having a grinding wheel and having a regulating wheel opposite the grinding wheel to define a grinding throat therebetween, the grinding throat having a front end and a rear end and having a blade therein with an upper surface having a front end and a rear end to support a workpiece, the regulating wheel tilted to impart axial movement to the workpiece toward the rear end of the throat, a magnetized striker wheel mounted adjacent the rear end of the grinding throat in the plane of the blade, the striker wheel extendnig into the path of a workpiece leaving the upper surface of the blade to arrest advance of the workpiece, the striker wheel positioned to strike a workpiece beyond the rear end of said blade surface to tilt the workpiece about said rear end of said blade surface and out of the grinding throat, and means to rotate the striker wheel.

References Cited by the Examiner
UNITED STATES PATENTS 1,847,466   3/1932   Binns.
2,990,656   7/1961   Tompkins _____ 51—103.1

LESTER M. SWINGLE, *Primary Examiner.*